United States Patent
Leidenfrost

[15] 3,663,023
[45] May 16, 1972

[54] LABYRINTH GAP SEAL

[72] Inventor: Reinhold Leidenfrost, Schwabacherstrasse 28, Birkenstrafe, 101, Germany

[22] Filed: Dec. 4, 1970

[21] Appl. No.: 95,160

Related U.S. Application Data

[63] Continuation-in-part of Ser. No. 748,681, July 30, 1968, abandoned.

[30] Foreign Application Priority Data

Aug. 11, 1967 Germany ...................... P 16 50 083.7

[52] U.S. Cl. ............................................................. 277/56
[51] Int. Cl. ........................................................ F16j 15/44
[58] Field of Search .................... 277/56, 70, 67, 133, 55, 13, 277/55, 57, 59, 224

[56] References Cited

UNITED STATES PATENTS

| 845,701 | 2/1907 | Moore | 277/70 |
| 2,245,281 | 6/1941 | Klopak | 277/59 |
| 2,487,177 | 11/1949 | Pollock | 277/56 |
| 2,824,759 | 2/1958 | Tracy | 277/224 |

FOREIGN PATENTS OR APPLICATIONS

| 1,219,745 | 6/1966 | Germany | 277/56 |

Primary Examiner—Robert I. Smith
Attorney—Hammond & Littell

[57] ABSTRACT

A gap seal having a labyrinth interface between two concentric rings having a means for expelling foreign matter which penetrates said interface and process for the production of said gap seals.

3 Claims, 10 Drawing Figures

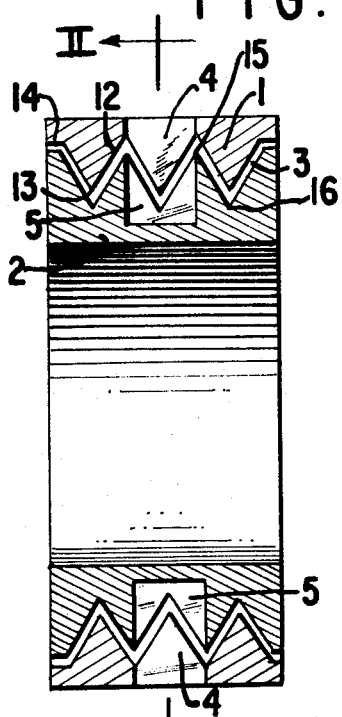
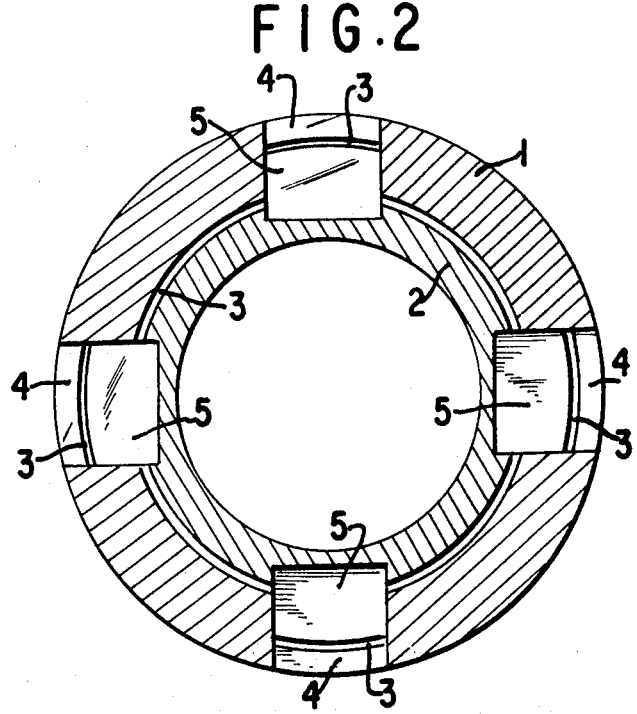
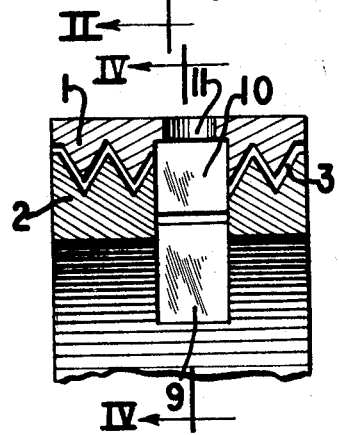
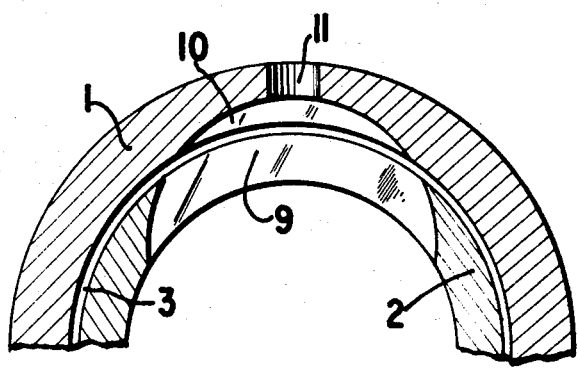
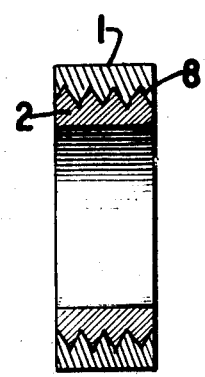

3,663,023

LABYRINTH GAP SEAL

REFERENCE TO PRIOR APPLICATION

This application is a continuation-in-part of my copending application Ser. No. 748,681 filed July 30, 1968 and now abandoned.

BACKGROUND OF THE INVENTION

Heretofore, seals have been used in bores, aperatures and sleeves which encase shafts and armatures to preclude the entry of foreign matter such as water, soot or the like. Most widely used is the gliding and sliding seal which contacts the surface of the rotating shaft to form a barrier to the atmosphere. While these seals have generally proven satisfactory in excluding foreign matter, life expectancy is relatively short due to wear and replacement is frequent.

One recent innovation in seals is disclosed in U.S. Pat. No. 3,465,425. This reference suggests a gap or labyrinth seal which includes a zig-zag, contact-free interface between an outer ring disposed within the bore of a housing and an inner ring secured to a rotating shaft. The interface between the two concentric rings consist of a series of aligned V-shaped valleys and peaks which define a zig-zag path to preclude the entry of foreign particles. While this seal has generally proved satisfactory to increasing life expectancy of the seal because of the absence of frictional engagement, nonetheless liquids have succeeded in penetrating the interface because the centrifugal force imparted by the rotating shaft allows the liquid to creep over the peaks and thereafter contact and corrode the bearing which mounts the shaft.

SUMMARY OF THE INVENTION

The present invention overcomes the heretofore stated shortcomings in gap seals having labyrinth surfaces by providing means for expelling foreign matter such as water, soot or the like from the seal interface. More particularly, the present invention envisions the provision of a number of crucially located aperatures along the path traveled by the foreign matter through the interface. In addition, the present invention provides a process for the production of the gap seals having aperatures therein where the aperatures are milled in the gap seal before the sealing gap is formed whereby the inclusion of foreign material such as mill cuttings in the sealing gap is avoided.

BRIEF DESCRIPTION OF THE DRAWINGS

The various features of the apparatus of this invention will become apparent from the following detailed description set forth in connection with the accompanying drawings which relate to the preferred embodiment of the present invention and are given by way of illustration.

FIG. 1 is a longitudinal cross-sectional view of the ogee interface portion of the present invention.

FIG. 2 is a cross-sectional view taken along the line II—II of FIG. 1.

FIG. 3 is a longitudinal cross-sectional view similar to FIG. 1 of an alternate embodiment of the present invention.

FIG. 4 is a cross-sectional view taken along the line IV—IV of FIG. 3.

FIGS. 5 to 10 show a process of manufacture according to the invention in separate process steps.

DETAILED DESCRIPTION OF THE INVENTION

Figure 6:
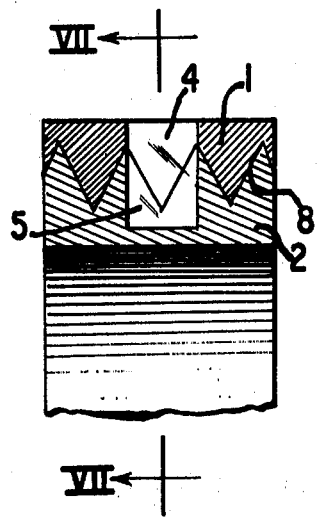

Referring now to the preferred embodiment in FIG. 1, a gap seal of the present invention comprising an outer ring 1 and inner ring 2 is set forth. The gap seal is of the type used with a rotatable shaft mounted in the bore of a housing or sleeve to preclude the entry of moisture and foreign matter into the bearing assembly which mounts the shaft for rotation. The inner ring is adapted to be secured on a rotatable shaft and the outer ring is aligned with the inner ring and secured within the bore. The interface 3 formed between the outer ring and the inner ring includes an ogee profile on the inner surface of the outer ring and the outer surface of the inner ring. The term "ogee" in this case refers to a continuous series of pronounced V-shaped peaks and valleys formed on the surfaces and matingly aligned. However, it should be apparent that the shape of the peaks and valleys of the ogee profile should not be limited to a V-shape.

The ogee inner face 12 of the outer ring 1 comprises ridges 13 and valleys 14. The inner ring 2 includes a circumferential ogee profile comprising peaks 15 and valleys 16 dimensionally comparable with inner face of ring 1 so that the valleys of the inner ring mesh or are aligned in the valleys of the outer ring, and conversely the peaks of the outer ring are aligned in the valleys of the inner ring. It should thus be apparent that, normally, foreign particles would be excluded from passing through the interface into the bearing assembly mounting the shaft for rotation. Nonetheless, because of the centrifugal force imparted by the rotating shaft, liquids such as water are able to penetrate the interface of the seal and creep along the shaft to the bearing assembly. Accordingly, the gap seal of the present invention is provided with angularly spaced openings 4 in the outer ring 1 which communicates with the interface over a width equal to at least the distance between two valleys 14. The angularly spaced openings 4 continue with extensions 5 in the inner ring 2. The openings 4 and extensions 5 lie in substantially the same vertical plane and are preferably disposed at approximately 90° intervals about the circumference of the ring, although one, two or more than four of the openings 4 and extensions 5 may be provided.

Water and foreign matter moving along the interface 3 collects in a greater volume in the extensions 5 and a greater quantity of water is bailed from the interface 3 when the extensions 5 are rotated into alignment with the opening 4. In this embodiment, the extensions 5 are also angularly spaced about the circumference of the shaft 2 at approximately 90° intervals. The interior configuration of the extension 5 conforms to the openings 4 in the inner ring. It should be appreciated that suitable ducts may be provided to convey the expelled water from the area surrounding the seal.

FIGS. 3 and 4 discloses an alternative embodiment of the present invention which includes diametrically opposed apertures 11 in the ring 1 have a communicating cucular cutout 10 and a symmetrical mating cutout 9 in the inner ring 2. The circular cutout 9 of the inner ring 2 serves to continuously pump water that penetrates the interface via centrifugal force out the aperatures 11.

The gap seal of the invention having openings 4 and extensions 5 therein is readily produced following the method described in U.S. Pat. No. 3,465,425 in that prior to the formation of the interface 3 or sealing gap the opening 4 and its extension 5 or the apertures 11 and circular cutouts 10 and 11 are milled in the outer ring 1 and inner ring 2. Thereafter, the interface 3 or sealing gap is introduced between the inner ring 2 and the outer ring 1. By this method, any mill cuttings are removed before the interface 3 or gap seal is introduced. In addition, it is substantially easier to mill or cut the openings 4 and extensions 5 in the outer ring 1 and inner ring 2 before the interface 3 or sealing gap is formed. After the same is formed, a milling or cutting operation is likely to create enlarged extensions 5 in the inner ring 2 since this inner ring can rotate with respect to the outer ring 1. The same is also true of the milling of the circular cutouts 9 and 10 in reference to FIGS. 3 and 4.

In other words, employing this process, first of all the one ring is produced for example by means of machining or by any other suitable method of manufacture. If this ring is provided with a profile on its surface facing the gap, it is not necessary that this profile be formed with specific accuracy. The form of the profile itself can vary within broad limits as long as care is taken that the profiled surface has an exact round contour with respect to the other surface. Moreover, care should be taken that the ring is as smooth as possible on its surface facing the gap in peripheral direction, whereas any unevenness in the longitudinal direction of the ring, as for instance, in the turning grooves, will not cause any interference but may even in certain cases improve the sealing action.

By subsequently applying material onto the one profiled surface of the first ring, the second ring is obtained which, due to the fact that the material applied penetrates into all of the recesses of the profiled surface of the first ring, obtains a surface which represents completely and in all details the negative of the profiled surface of the first ring. From this fact it can be concluded that any unevenness in the profile of the first ring is absolutely insignificant.

The openings in the outer ring and the extensions in the inner ring or the apertures and circular cutouts are then made by milling or cutting, either in one operation as in FIG. 2 or two operations as in FIG. 4.

In the following process step by expanding the outer ring and/or by shrinking the inner ring, the required gap is finally obtained. It follows therefrom that it is possible by means of this method to vary the width of the sealing gap to a great extent. According to the extent to which this expansion and/or the shrinkage of one or the other ring is effected, sealing gaps of quite variable widths can be produced.

In the process of production illustrated in FIGS. 5 to 10, the process starts with a gap seal intermediate shown in FIG. 5 consisting of an inner ring 2 having a smooth base and a sawtooth-shaped profile 8, to which has been applied a working material forming the outer ring 1.

Figure 7:
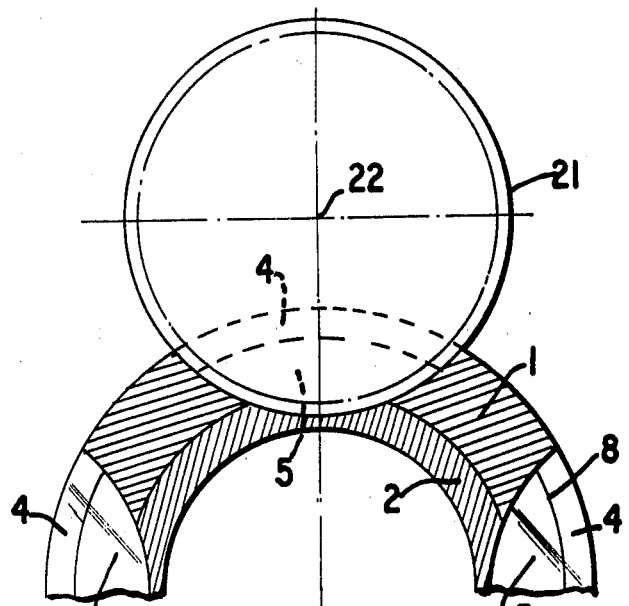
Figure 8:
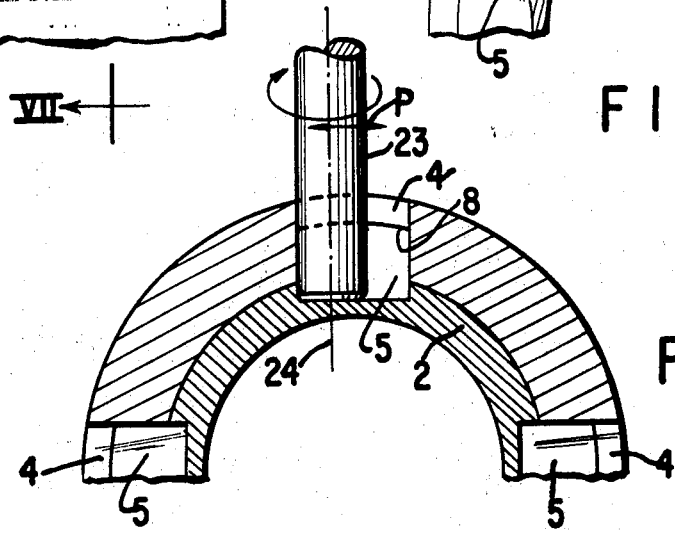

In the next process step shown in FIGS. 6 to 8, an opening 4 in the outer ring 1 and an extension 5 in the inner ring 2 is cut, bored or milled in one operation. Preferably, the openings 4 and extensions 5 are made by a side-milling cutter 21 as shown in FIG. 7 or an end-milling cutter 23 as shown in FIG. 8.

In FIG. 7, the side-milling cutter 21 rotates around its center 22 and is gradually introduced into its cutting position in a known manner. In FIG. 8, the end-milling cutter 23 is rotated around its axis 24 and in addition, is moved back and forth as illustrated by the arrow P in order to make the longitudinal slot of the opening 4 and extension 5.

Figure 9:
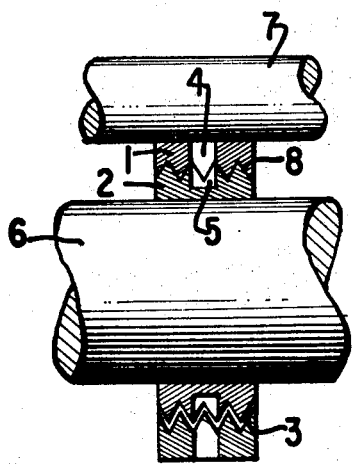
Figure 10:
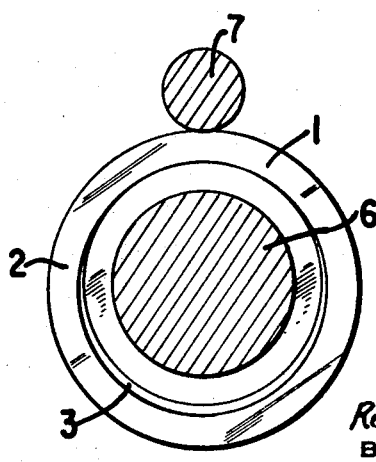

In the next process step, shown in FIGS. 9 and 10 the two rings 1 and 2 thus formed an in close abutment to each other, are subjected simultaneously to a rolling process. For this purpose, for example, a roll mandrel 6 is introduced into the bore of the ring 1, which can fill this bore completely. However, it is also possible to use a roll mandrel with a diameter smaller than that of the bore of the ring 1. The roller 7 acts under pressure on the outer ring 1. When this roller 7 rotates under pressure, the outer ring 1 consisting of a material easier to deform than that used for ring 2 is expanded, resulting in the sealing gap 3, its width determined by the duration of the rolling process and by the pressure of the rolls.

Although several embodiments of the present invention have been illustrated and described, it will be evident to those skilled in the art that various modifications may be incorporated into the details of production without departing from the principles herein set forth.

I claim:

1. A gap seal for excluding the passage of foreign matter along a rotating shaft comprising an inner ring having a circumferential ogee profile adapted for mounting on a shaft, an outer ring having an arcuate ogee inner face matingly aligned with said profile forming an interface therewith, and at least one opening disposed in said outer ring opening to the atmosphere, said opening projecting beyond said interface into said inner ring for expelling foreign matter from said interface.

2. A gap seal according to claim 1 wherein a plurality of said openings are disposed in said outer ring lying in the same plane and said inner ring includes a plurality of detents conforming in shape to said openings in said outer ring.

3. A gap seal according to claim 1 wherein a plurality of said openings are disposed in said outer ring lying in the same plane and said inner ring includes a plurality of detents which project through said inner ring.

* * * * *

UNITED STATES PATENT OFFICE
CERTIFICATE OF CORRECTION

Patent No. 3,663,023          Dated May 16, 1972

Inventor(s)     Reinhold Leidenfrost

It is certified that error appears in the above-identified patent and that said Letters Patent are hereby corrected as shown below:

On the cover sheet [72]" Schwabacherstrasse 28, Birkenstrafe, 101, Germany" should read -- Schwabacherstrasse 28 8501 Feucht, Germany --. Column 4, line 3, "an" should read -- and --.

Signed and sealed this 17th day of April 1973.

(SEAL)
Attest:

EDWARD M. FLETCHER, JR.
Attesting Officer

ROBERT GOTTSCHALK
Commissioner of Patents